Feb. 20, 1923.

J. G. TALLMAN.

REPAIR CLAMP FOR BURSTED OR SPLIT PIPE, HOSE, ETC.

FILED JUNE 29, 1922.

1,445,858.

INVENTOR:
Joseph G. Tallman.
BY Wiedersheim & Fairbanks.
ATTORNEYS.

Patented Feb. 20, 1923.

1,445,858

UNITED STATES PATENT OFFICE.

JOSEPH G. TALLMAN, OF PHILADELPHIA, PENNSYLVANIA.

REPAIR CLAMP FOR BURSTED OR SPLIT PIPE, HOSE, ETC.

Application filed June 29, 1922. Serial No. 571,781.

*To all whom it may concern:*

Be it known that I, JOSEPH G. TALLMAN, a citizen of the United States, residing in the city and county of Philadelphia, State of Pennsylvania, have invented a new and useful Repair Clamp for Bursted or Split Pipe, Hose, Etc., of which the following is a specification.

My invention relates to a device for repairing a pipe, hose, or the like that has burst or been otherwise fractured whereby it is liable to leak, and the invention consists of a bushing adapted to encircle the pipe, etc. and cover the fracture, a sleeve-like member on the bushing adapted to compress the same, and a clamp formed of movable sections adapted to contract said sleeve-like member which being interposed between the bushing and clamp is adapted to have the clamp ride thereon in its tightening motion, whereby the bushing is prevented from leaking and being injured by the clamp in the tightening motion of either section or both sections thereof.

The invention is satisfactorily illustrated in the accompanying drawing, but the important instrumentalities thereof may be varied, and so it is to be understood that the invention is not limited to the specific details shown and described, as long as they are within the spirit or scope of the claim.

Similar numerals of reference indicate corresponding parts in the figures.

Figure 1:
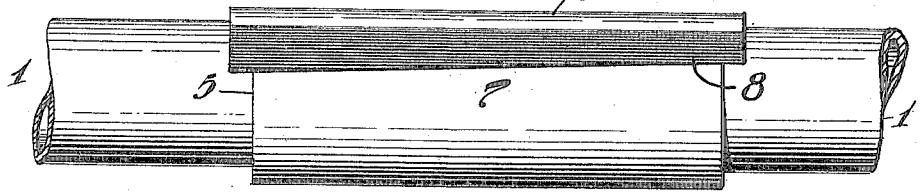
Figure 1 represents a side elevation of a fractured pipe embodying my invention.
Figure 2:
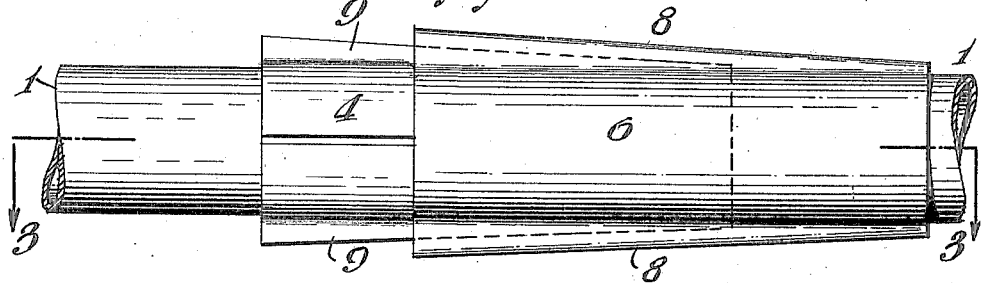
Figure 2 represents a plan view thereof.
Figure 3:
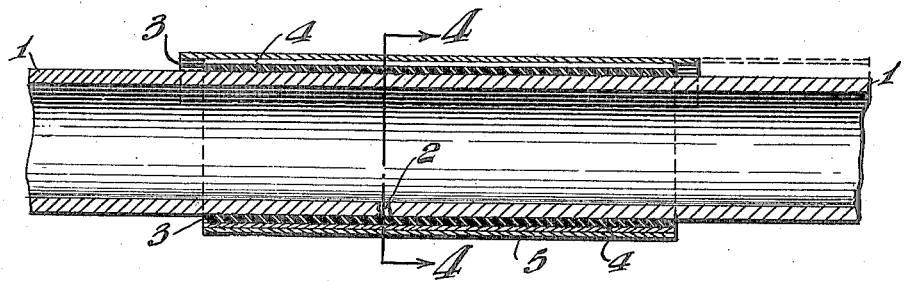
Figure 3 represents a longitudinal section thereof on line 3—3 Figure 2.

Referring to the drawings.

1 designates a pipe whose wall has been fractured, split or bursted forming the hole opening or fracture 2 therein. In order to cover the latter and so repair the pipe so that it may render further service, I place over the pipe the tubular bushing 3 of soft rubber or other resilient or pliable material, the same encircling the exterior of the pipe and covering said fracture 2 so that the fluid admitted in the pipe may flow through the same without leaking at said opening.

Fitted over said bushing and encircling the same is the tubular sleeve 4 which formed of metal or other suitable hard material is split or divided whereby the ends may be brought together and the sleeve so contracted as to compress the bushing thus closing it tightly against the pipe and consequently the outer wall of the opening 2, and thus seal the same for the purpose above stated.

Figure 4:
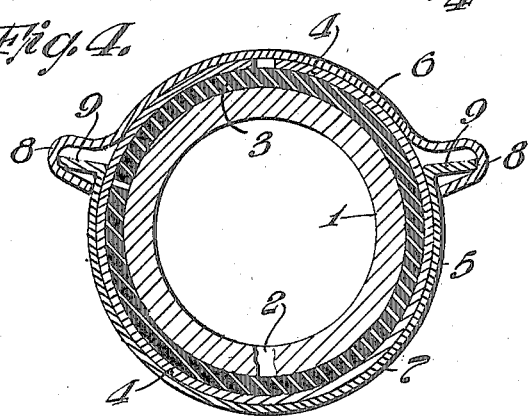
Figure 4 represents a diametrical section on line 4—4 Figure 3, on an enlarged scale.

In order to cause the contraction of the sleeve, I surround the same with the clamp 5 which is formed of separate partly tubular sections 6 and 7, the section 6 having on its side terminals the inturned runways 8, and the section 7 having on its side terminals the outturned tongues 9, the latter being adapted to enter the former, as most plainly shown in Figure 4.

The runways and tongues are tapering in their longitudinal direction whereby they gradually increase in width in said direction from one end to the other of the clamp.

The operation is as follows:—

When the bushing and sleeve are located respectively on the pipe either section of the clamp is placed over the sleeve and the narrow end of one section is presented to the wide end of the other section, or vice versa, and the former is moved into the latter, or vice versa, whereby the runways and tongues engage, thus connecting the section, and owing to the tapering form of said tongues and runways, the sections are gradually tightened on the sleeve so as to close and compress the latter. This causes a compression of the bushing, whereby the latter is pressed tightly on the pipe and so the opening 2 is reliably closed and so leakage of the pipe at said opening is prevented.

Owing to the interposed sleeve the clamp is removed from contact with the bushing, and so as either section is slidingly moved on the other to tighten the section, the movable section rides on the surface of the sleeve and so preserves the bushing from being cut or otherwise injured while the sleeves present a smooth and unbroken surface to the movement of the section permitting the section to be driven into the other section without obstruction and consequently with freedom.

It is evident that when the proper ends of the sections are presented to each other, one section may be forced to the right, and the other section forced to the left, thus causing the engagement of the runways and tongues and the tightening of the sections, and the pressure of the clamp on the sleeve, the result being the same as hereinbefore stated.

It will be noticed that when the members of the device are in position the fractured pipe is completely encircled by the hard tubular bushing 3, and the latter is completely encircled by the resilient or pliable tubular sleeve 4. Then said sleeve is completely encircled by the two part tubular clamp 5, consequently the sleeve is uniformly compressed on the bushing all around the same, and the latter is uniformly compressed on the pipe all around the same, and so there will be no buckling of the bushing or formation of vents in said bushing, and so the fracture in the pipe will be reliably closed and air or water passed through the pipe cannot escape therefrom at the existing fracture.

Having thus described my invention what I claim as new and desire to secure by Letters Patent, is:—

In a pipe repair clamp, a tubular bushing of pliable material adapted to encircle a pipe at the fracture thereof, a tubular split sleeve of hard material adapted to be fitted over said bushing, and a clamp adapted to be placed on said sleeve in contact therewith, said clamp being formed of slidingly movable sections having respectively on the sides thereof tongues and runways adapted to form locking joints for said sections, said joints being tapering in their longitudinal direction whereby the sections tighten on each other and contract the sleeve and compress the latter on the bushing around the same which bushing in turn is compressed on the pipe, said sections of the clamp in their tightening movements being in contact directly with said sleeve.

JOSEPH G. TALLMAN.

Witnesses:
JOHN A. WIEDERSHEIM,
N. BUSSINGER.